US012755960B2

(12) United States Patent
Wu et al.

(10) Patent No.: US 12,755,960 B2
(45) Date of Patent: Oct. 6, 2026

(54) PREPARATION METHOD AND APPLICATION OF LITHIUM COBALT OXIDE SOFT-PACK BATTERY

(71) Applicants: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

(72) Inventors: Xingyu Wu, Foshan (CN); Changdong Li, Foshan (CN); Dingshan Ruan, Foshan (CN); Linlin Mao, Foshan (CN); Maohua Feng, Foshan (CN); Bin Li, Foshan (CN)

(73) Assignees: GUANGDONG BRUNP RECYCLING TECHNOLOGY CO., LTD., Foshan (CN); HUNAN BRUNP RECYCLING TECHNOLOGY CO., LTD., Changsha (CN); HUNAN BRUNP EV RECYCLING CO., LTD., Changsha (CN)

( * ) Notice: Subject to any disclaimer, the term of this patent is extended or adjusted under 35 U.S.C. 154(b) by 583 days.

(21) Appl. No.: 18/229,186

(22) Filed: Aug. 2, 2023

(65) Prior Publication Data

US 2023/0411596 A1 Dec. 21, 2023

Related U.S. Application Data

(63) Continuation of application No. PCT/CN2021/142777, filed on Dec. 30, 2021.

(30) Foreign Application Priority Data

Mar. 18, 2021 (CN) ........................ 202110292463.X

(51) Int. Cl.
*H01M 4/1391* (2010.01)
*H01M 4/04* (2006.01)
(Continued)

(52) U.S. Cl.
CPC ....... *H01M 4/1391* (2013.01); *H01M 4/0416* (2013.01); *H01M 4/0435* (2013.01);
(Continued)

(58) Field of Classification Search
CPC ............. H01M 4/1391; H01M 4/0416; H01M 4/0435; H01M 4/131; H01M 4/0404;
(Continued)

(56) References Cited

U.S. PATENT DOCUMENTS

2021/0320378 A1* 10/2021 Lee .................. H01M 10/0525
2023/0327090 A1* 10/2023 Li ....................... H01M 4/5825
429/224

FOREIGN PATENT DOCUMENTS

CN 101257132 A 9/2008
CN 104409778 A 3/2015
(Continued)

OTHER PUBLICATIONS

International search report of PCT Patent Application No. PCT/CN2021/142777 issued on Mar. 9, 2022.

*Primary Examiner* — Aiqun Li
(74) *Attorney, Agent, or Firm* — Westbridge IP LLC

(57) ABSTRACT

The invention belongs to the technical field of batteries, and discloses a preparation method and application of a lithium cobalt oxide soft-pack battery. The preparation method comprises the following steps: preparation of a lithium cobalt oxide positive electrode; preparation of a graphite negative electrode; preparation of an aluminum plastic film; screening and tab welding the positive and negative electrode, then winding core and packing, injecting an electro-
(Continued)

lyte to a resulting pack, perform first sealing, formation, second sealing; followed by capacity grading to obtain the lithium cobalt oxide soft pack battery. The preparation method for the lithium cobalt oxide soft-pack battery in a laboratory environment at room temperature provided by the present invention has simple operation and low environmental requirements, can be used in laboratories without dry room conditions, and reduces research and development cost and laboratory maintenance cost.

7 Claims, 2 Drawing Sheets

(51) Int. Cl.

| | |
|---|---|
| ***H01M 4/131*** | (2010.01) |
| ***H01M 10/0525*** | (2010.01) |
| ***H01M 10/0587*** | (2010.01) |
| ***H01M 50/105*** | (2021.01) |
| ***H01M 50/536*** | (2021.01) |

(52) U.S. Cl.
CPC ....... *H01M 4/131* (2013.01); *H01M 10/0525* (2013.01); *H01M 10/0587* (2013.01); *H01M 50/105* (2021.01); *H01M 50/536* (2021.01)

(58) Field of Classification Search
CPC .... H01M 4/133; H01M 4/1393; H01M 4/622; H01M 4/625; H01M 4/661; H01M 4/04; H01M 4/139; H01M 4/525; H01M 4/62; H01M 4/587; H01M 4/623; H01M 10/0525; H01M 10/0587; H01M 10/04; H01M 10/058; H01M 50/124; H01M 50/105; H01M 50/536; Y02E 60/10; Y02P 70/50
See application file for complete search history.

(56) References Cited

FOREIGN PATENT DOCUMENTS

| | | | |
|---|---|---|---|
| CN | 105336943 | A | 2/2016 |
| CN | 107302105 | A | 10/2017 |
| CN | 105226330 | B | 11/2017 |
| CN | 107863535 | A | 3/2018 |
| CN | 108511748 | A | 9/2018 |
| CN | 109148820 | A | 1/2019 |
| CN | 109326827 | A | 2/2019 |
| CN | 109994738 | A | 7/2019 |
| CN | 110660965 | A | 1/2020 |
| CN | 110911771 | A | 3/2020 |
| CN | 111834632 | A | 10/2020 |

* cited by examiner

PREPARATION METHOD AND APPLICATION OF LITHIUM COBALT OXIDE SOFT-PACK BATTERY

CROSS-REFERENCE TO RELATED APPLICATIONS

The present application is a continuation application of PCT application No. PCT/CN2021/142777 filed on Dec. 30, 2021, which claims the benefit of Chinese Patent Application No. 202110292463.X filed on Mar. 18, 2021. The contents of all of the aforementioned applications are incorporated by reference herein in their entirety.

TECHNICAL FIELD

The invention belongs to the technical field of batteries, in particular to a preparation method and application of a lithium cobalt oxide soft-pack battery.

BACKGROUND

With the development of society, lithium-ion batteries are widely used in our life with the advantages of high voltage, high energy density and good cycle performance. Among them, lithium cobalt oxide cathode materials play an important role in the batteries of 3C digital products. With the development of batteries, people have higher and higher requirements. High rate, long cycle, high voltage and high safety performance have become the key topic in the research of lithium cobalt oxide materials. In recent years, the lithium cobalt oxide material has developed from a voltage of 4.2 V to the current 4.45 V, but it still cannot meet people's demand for high-voltage materials and higher voltage lithium cobalt oxide materials are also being further studied. Therefore, the ability to accurately detect the materials' performance in a laboratory will greatly save the cost of research and development. At present, the main method to test the electrical performance of batteries in a laboratory is to assemble them into button batteries, such as a soft-pack battery for testing, which will provide better feedback on the actual application of the material and help speed up the development of high-voltage lithium cobalt oxide cathode materials. However, at present, the production of soft-pack batteries in the laboratory requires strict environmental temperature and humidity, and requires operation in a dry room, resulting in high laboratory operation costs and increased costs for research and development.

A related prior art mentions a method for preparing the positive and negative electrode slurry of a lithium cobalt oxide battery, in which a ball milling process is added in when the materials are mixed, resulting in high cost, easily introduced impurities and material loss, making it unable to accurately evaluate the performance of lithium cobalt oxide cathode materials. There is also a related art that discloses a method for preparing a high-energy-density soft-packed lithium battery with thick pole pieces. The preparation process is briefly introduced, which has a great effect on improving the energy density of the soft-pack battery. However, this method is only suitable for nickel-cobalt lithium aluminate cathode materials and is difficult to use on other cathode materials. In another related art, a method for preparing a soft-pack battery is disclosed. The method is mainly to improve the liquid injection process of the soft-pack battery preparation, which improves the production efficiency of the battery cell and reduces the defective rate.

However, the equipment used in this method is more complicated and difficult to be applied in a laboratory.

SUMMARY OF THE INVENTION

The present invention aims to solve at least one of the technical problems existing in the above-mentioned prior arts. To this end, the present invention provides a method for preparing a lithium cobalt oxide soft-pack battery and its application. The electrical properties of the lithium cobalt oxide cathode materials produced by the method can be accurately characterized in a laboratory at ambient temperature conditions. The soft-pack battery produced is low cost and has good cycle performance and high safety.

In order to achieve the above objectives, the present invention adopts the following technical solutions:

A preparation method for preparing a lithium cobalt oxide soft-pack battery, comprises the following steps:

(1) Mixing a lithium cobalt oxide cathode material, polyvinylidene fluoride, carbon black and an organic solvent, stirring and then vacuumizing, sieving, coating a resulting slurry on an aluminum foil, rolling, slitting, and drying to obtain a positive electrode strip;

(2) Mixing a graphite material, a carboxymethyl cellulose salt, carbon black, a conductive agent, styrene-butadiene rubber and water, and then vacuumizing, sieving, coating a resulting slurry on a copper foil, rolling, slitting, and drying to get a negative electrode strip;

(3) Cutting an aluminum-plastic film, and then performing a punching process and drying to obtain an aluminum-plastic film with pits;

(4) Performing screening and tab welding to the positive electrode and negative electrode strip respectively, winding the positive electrode strip, the negative electrode strip and a separator to make an electric core, and then performing hot pressing to obtain a hot-pressed electric core;

(5) Placing the hot-pressed electric core in the pit of the aluminum-plastic film, folding the aluminum-plastic film in half, heat-sealing the sides of the film, and then vacuum drying to obtain a vacuum-dried pack;

(6) Filling the vacuum-dried pack with an electrolyte in a glove box, letting stand before performing a first sealing, then performing formation, letting stand to release gas, and performing a second sealing to obtain a battery;

(7) Capacity grading the battery to obtain the lithium cobalt oxide soft-pack battery.

Preferably, in step (1), the mass ratio of the lithium cobalt oxide cathode material, polyvinylidene fluoride and the carbon black is (90-96): (2-5): (1-5).

Preferably, in step (1), the organic solvent is N-methylpyrrolidone, and the mass of the N-methylpyrrolidone is 40%-55% of the weight of the powder (lithium cobalt oxide cathode materials and carbon black).

Preferably, in step (1), the polyvinylidene fluoride and the organic solvent are stirred first, then carbon black (super-p) is added and stirred, and finally the lithium cobalt oxide cathode material is added and stirred; the stirring time after the different additions is 2-4 h, 2-5 h and 3-6 h respectively.

Further preferably, the mixing is carried out with a mixer at a revolution speed of 40-50 r/min, and at a rotation speed of 2000-2800 r/min. More preferably, at a revolution speed of 45 r/min, and a rotation speed of 2600 r/min.

Preferably, in step (1), after the vacuumizing, a lithium cobalt oxide cathode material slurry is obtained, and the slurry has a viscosity of 3000-5000 mPa s.

Preferably, in step (1), the vacuumizing is carried out for 0.5-2 h at a vacuum degree of 0.08 to 0.09 MPa.

Preferably, in step (1), the sieving is carried out with a screen having a size of 100 to 200 mesh; further preferably, the screen has a size of 150 mesh.

Preferably, in step (1), the coating is carried out with a coater at a roller speed of 10-25 m/min, the drying is carried out at 120° C., and the coating is carried out at an areal density of 1.5-1.8 $g/dm^2$.

Preferably, in step (1), the rolling is carried out with a roller press having a tonnage of 30-100 tons, and the compaction density is 3.8-4.3 $g/cm^3$.

Preferably, in step (1), the width of the positive electrode strip is 3-6 cm.

Preferably, in steps (1) to (3), the drying temperature is 90-120° C., the drying time is 8 to 15 h, and the vacuumizing is carried out at a vacuum degree of −0.08-−0.06 Mpa.

Preferably, in step (2), the mass ratio of the graphite anode material, the carbon black, the conductive agent, the carboxymethyl cellulose salt and the styrene butadiene rubber is (92-95): (0.3-1): (0.8-2): (1-3): (1.5-4).

Preferably, in step (2), the carboxymethyl cellulose salt is sodium carboxymethyl cellulose.

Preferably, in step (2), the water is deionized water.

Preferably, in step (2), the weight of the water is 140-170% of the weight of the powder (graphite anode material and carbon black).

Preferably, in step (2), the carboxymethyl cellulose salt and the water are stirred first for 2-4 h; then carbon black (super-p) and the conductive agent (SFG-6) are added and stirred for 2-5 h; then the graphite negative electrode material is added and stirred for 3-5 h; finally, the styrene-butadiene rubber is added and stirred for 0.5-1 h.

Preferably, in step (2), the revolution speed of the mixer used in the stirring process is 40 to 50 r/min, and the rotation speed is 2000 to 800 r/min. More preferably, the revolution speed of the mixer is 45 r/min, and the rotation speed is 2600 r/min.

Preferably, in step (2), after the vacuumizing, a graphite anode material slurry is obtained, and the slurry viscosity is 1000-3000 mPa s.

Preferably, in step (2), the vacuumizing is carried out for 0.5-2 h with a vacuum degree of 0.08 to 0.09 MPa.

Preferably, in step (2), the sieving is carried out with a screen having a size of 50-150 mesh, and a further preferred size of the screen is 100 mesh.

Preferably, in step (2), the coating is carried out by a coating machine at a roller speed of 10-25 m/min, the drying temperature is 90-110° C., the N/P value is 1.05-1.25, and the calculation formula of the N/P value is as follows: (capacity per gram of the negative electrode active material× areal density of the negative electrode×proportion of the negative electrode active material content)/(capacity per gram of the positive electrode active material×areal density of the positive electrode×proportion of the positive electrode active material content), and the areal density is 0.9-1.25 $g/dm^2$.

Preferably, in step (2), the rolling is carried out by a roller press have a tonnage of 30-70 tons, and the compaction density is 1.4-1.6 $g/cm^3$.

Preferably, in step (2), the width of the negative electrode strip is 3.5-6.5 cm.

Preferably, in step (3), the cut width of the aluminum plastic film is 10-14 cm, and the cut length is 12-14 cm.

Preferably, in step (4), the screening criteria for the positive and negative electrodes are no wrinkles, no damage, and no leakage matrix. The tabs welded on the positive electrode bar are aluminum tabs, and the tabs welded on the negative electrode bar are nickel tabs.

Preferably, in step (4), the winding is carried out in a sequence of separator-negative electrode strip-positive electrode strip, wherein the positive electrode strip and the negative electrode strip should be separated by the separator, and the positive electrode strip should be aligned with the position of the negative electrode strip.

Preferably, in step (4), the temperature of the hot pressing is 120-180° C.

Preferably, in step (5), the heat sealing is carried out by a heat sealing machine at a sealing temperature of 180-200° C.

Preferably, in step (5), the temperature of the vacuum drying is 90-110° C., the time of the vacuum drying is 12-24 h, and the vacuum degree of the vacuum drying box used for the vacuum drying is −0.09-−0.08 Mpa.

Preferably, in step (6), the electrolyte is a lithium hexafluorophosphate electrolyte, which comprises ethylene carbonate, dimethyl carbonate, and methyl ethyl carbonate in a volume ratio of 1:1:1.

Preferably, in step (6), the amount of the injected electrolyte is 2-4 g/Ah, and the standing time is 2-3 h.

Preferably, in step (6), after the sealing, a process of shaping the battery is further included. The shaping fixture is a self-made fixture, and the material of the fixture is epoxy board or hard glass. Shaping is to discharge the gas generated by the SEI (Solid Electrolyte Interface) film into an air bag; and the thickness of the shaped SEI (Solid Electrolyte Interface) film is relatively uniform by exerting a uniform force is uniform.

Preferably, in step (6), the procedure of the formation is charging to 3.4-3.5 V at 0.02 or 0.05 C, leaving for 3-5 min, then charging to 3.6-3.7 V at 0.05 or 0.1 C, and leaving for 3-5 min, and finally charging to 3.9-4.0 V at 0.1 or 0.33 C, stopping, completing the formation process of the test cabinet.

Preferably, in step (6), the standing is placed in a high-temperature box to stand still, and the temperature of the high-temperature box is 40-50° C., and more preferably, the temperature of the high-temperature box is 45° C.

Preferably, in step (6), the head temperature of the second sealing machine used in the second sealing process is 150-200° C., the sharp knife piercing time is 2-5 s, the vacuum holding time is 5-8 s, and the degree of vacuum is −0.09-−0.08 Mpa.

Preferably, in step (7), the procedure of the capacity grading is charging to 4.2-4.5 V at 0.1 or 0.33 C, leaving it for 3-5 min, and then discharging to 3.0-3.2 V at 0.1 or 0.33 C, and finally charging to 4.0-4.2 V at 0.1 or 0.33 C, stopping, and completing the capacity grading of the lithium cobalt oxide soft-pack battery.

Preferably, in step (7), other electrical performance tests are also included, which are one or more selected from the group consisting of cycle performance (high temperature, normal temperature or low temperature), rate performance, AC impedance, cyclic voltammetry, capacity recovery performance and gas production properties during high-temperature storage.

The invention also provides the application of the preparation method in the preparation of laboratory soft-pack batteries.

Compared with the prior arts, the beneficial effects of the present invention are as follows:

1. The preparation method of the lithium cobalt oxide soft-packed battery of the present invention adds a drying process to the preparation of the positive and negative electrodes, and also to the aluminum-plastic film after punching pit, and performs heat sealing before vacuum drying, so as to achieve the purpose of preparation carried out in a laboratory environment at room temperature without a drying room. The preparation method is simple to operate and has low environmental requirements. It can be used in laboratories without a drying room, reducing R&D costs and laboratory maintenance costs.

2. The preparation method of the present invention is mainly aimed at the preparation of soft-pack batteries of lithium cobalt oxide cathode materials. The method can be applied to the soft-pack preparation of lithium cobalt oxide cathode materials with a variety of different voltages (for example: 4.2V, 4.3V, 4.4V, 4.45V, 4.48V, etc.). The first cycle efficiency of the prepared lithium cobalt oxide soft-pack battery is greater than 89%, and the 30-day capacity recovery rate is greater than 94.7%.

3. The lithium cobalt oxide soft-pack battery prepared by the present invention has the advantages of good cycle performance and excellent safety performance, and can distinguish the performance of different lithium cobalt oxide cathode materials under the same conditions, which can reduce the testing cost and certification cycle of the lithium cobalt oxide materials used in research and development or production lines.

DETAILED DESCRIPTION OF THE ILLUSTRATED EXAMPLES

Figure 1:
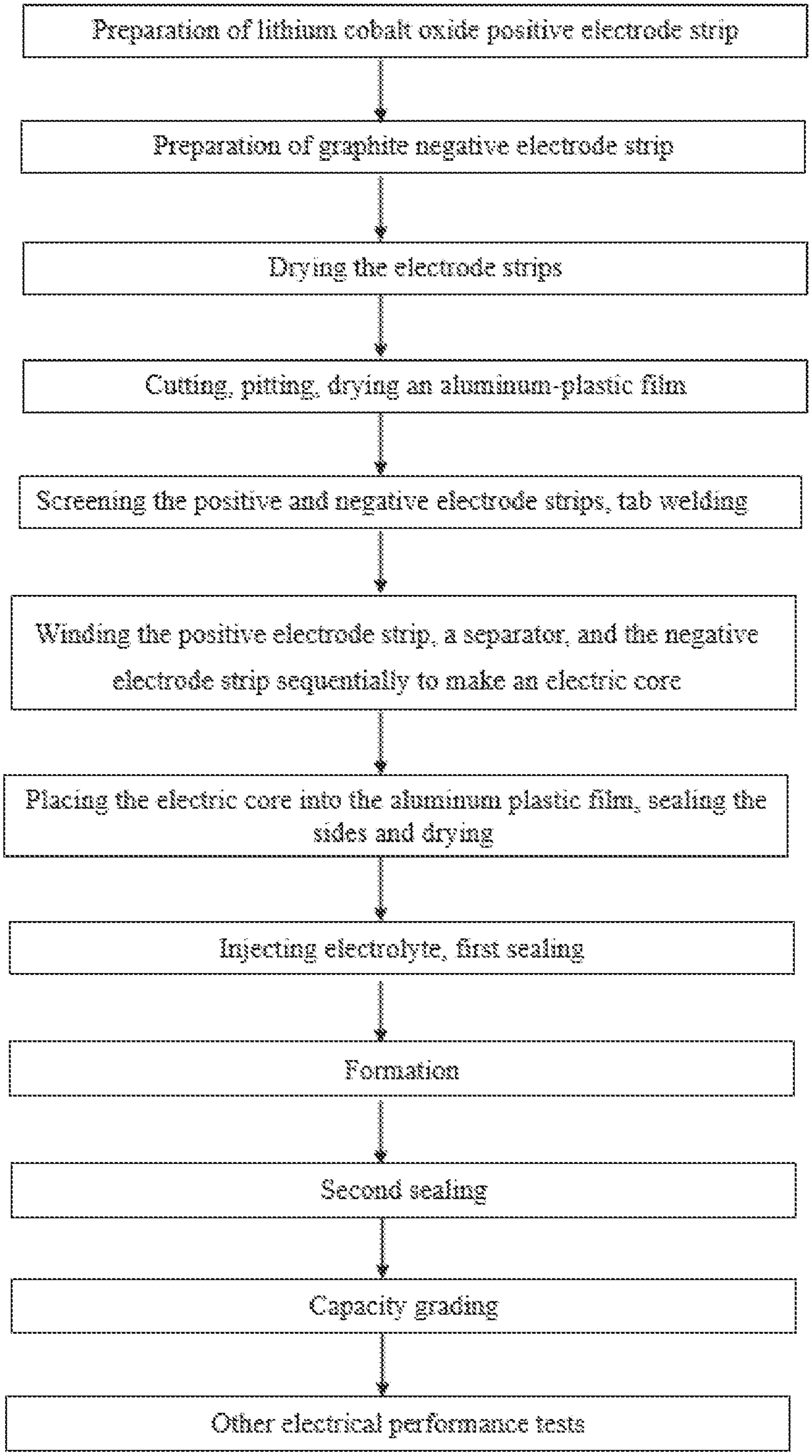
FIG. 1 is a flow chart of preparing a lithium cobalt oxide soft-pack battery in Example 1 of the present invention.

Hereinafter, the concept of the present invention and the technical effects produced by it will be described clearly and completely with reference to the examples, so as to make the purpose, features and effects of the present invention fully understood. Obviously, the described examples are only a part of the examples of the present invention, rather than all of them. Based on the examples of the present invention, other examples obtained by those skilled in the art without creative work belong to the scope of protection of the present invention.

EXAMPLE 1

The specific steps of the method for preparing the lithium cobalt oxide soft-pack battery of this example are as follows:

(1) Preparation of lithium cobalt oxide cathode strips:

(1.1) Drying the lithium cobalt oxide cathode material to be tested (applicable voltage 4.35 V) at 100° C. for 12 h;

(1.2) Weighing 504 g (96 parts) of lithium cobalt oxide cathode material, g (2 parts) of polyvinylidene fluoride, 10.5 g (2 parts) of carbon black (super-p) and 240 g of N-methylpyrrolidone;

(1.3) Setting the revolution speed of the mixer to 45 r/min and the rotation speed to 2600 r/min. First, mixing the polyvinylidene fluoride and N-methylpyrrolidone in the stirring tank, stirring for 2 h, and then adding carbon black (Super-p), continuing to stir for 3 hours; finally adding lithium cobalt oxide cathode material, continuing to stir for 3 hours, and then the measured viscosity of the slurry is 3500 mPa*s; vacuuming the slurry for 0.5 hours to eliminate bubbles in the slurry, obtaining lithium cobalt oxide cathode material slurry;

(1.4) Passing the lithium cobalt oxide cathode material slurry in step (1.3) through a 150-mesh screen to remove large-particle agglomerates in the slurry;

(1.5) Setting the roller speed of the coating machine to 10 m/min, and the drying temperature to 110° C. The sieved slurry in step (1.4) is coated on both sides, and the coating surface density is 1.6 g/dm$^2$, to obtain the dried positive electrode sheet;

(1.6) Rolling the positive electrode sheet obtained in step (1.5), setting the tonnage of the roller press to 50 tons, and the compaction density of the obtained electrode sheet is 4.15 g/cm$^3$;

(1.7) Splitting the positive electrode sheet prepared in step (1.6), and the width of the divided positive electrode strip is 4 cm;

(1.8) Drying the positive electrode strip in step (1.7) in a vacuum drying oven with a vacuum of −0.08 Mpa at 100° C. for 12 hours to obtain a dried lithium cobalt oxide positive electrode strip.

(2) Preparation of graphite anode strips:

(2.1) Drying the graphite material to be prepared in an oven at 90° C. for 12 hours;

(2.2) Weighing 1001.7 g (94.5 parts) of graphite anode material, 5.3 g (0.5 parts) of carbon black (super-p), 10.6 g (1 part) of conductive agent (SFG-6), 21.2 carboxymethyl cellulose sodium g (2 parts), 42.4 g (2 parts) of styrene butadiene rubber, and 1590 g of deionized water;

(2.3) Setting the revolution speed of the mixer to 45 r/min and the rotation speed to 2600 r/min. First mixing sodium carboxymethyl cellulose and deionized water, stirring for 3 hours, and then adding carbon black (super-p) and conductive agent (SFG-6) to it, stirring for 2 h, then adding graphite negative electrode material and stirring for 3 h, finally adding styrene butadiene rubber and stirring for 0.5 h; the measured slurry viscosity is 1530 mPa s. Vacuuming the slurry for 0.5 h to eliminate bubbles in the slurry to obtain graphite anode material slurry;

(2.4) Passing the graphite anode slurry obtained in step (2.3) through a 100-mesh screen to remove large agglomerated particles;

(2.5) Setting the roller speed of the coating machine to 10 m/min, the drying temperature to 95° C., and the N/P value to 1.1 to adjust the areal density of the negative electrode sheet;

(2.6) Roll pressing the negative electrode sheet obtained in step (2.5), and setting the tonnage of the roller press to 50 tons, and the compaction density of the obtained electrode sheet is 1.53 g/cm$^3$;

(2.7) Dividing the negative electrode sheet prepared in step (2.6), and the width of the divided negative electrode strip is 4.5 cm;

(2.8) Drying the negative electrode in step (2.7) in a vacuum drying oven with a vacuum of −0.08 Mpa at 100° C. for 12 hours to obtain a dried graphite negative electrode.

(3) Preparation of aluminum-plastic films: cutting the aluminum-plastic film into a size of 10*12 cm, completing the punching of the aluminum-plastic film on the aluminum-plastic film forming machine, and placing the punched aluminum-plastic film in a drying box at 80° C. for 12 h to remove the moisture.

(4) Screening of positive and negative strips and welding of tabs: screening the positive and negative strips after drying in steps (1) and (2) according to their appearance, and welding the aluminum tabs and nickel tabs to the positive and negative electrodes respectively.

(5) Winding of the cell: winding the positive and negative strips screened in step (4), and the separator on the winding machine in the order of diaphragm-negative strip-positive strip, and the wound cell is placed in a hot press and heat—pressed at 150° C.

(6) Lithium cobalt oxide soft-pack battery packaging: placing the battery cell hot-pressed in step (5) in the pit of the aluminum-plastic film. After the aluminum-plastic film is folded in half, putting it in a heat-sealing machine with a heat-sealing temperature of 180° C. for side-sealing. After that it is dried in a vacuum drying oven at 100° C. for 14 h.

(7) Lithium cobalt oxide soft-pack battery injection, first sealing: injecting the soft-pack battery dried in step (6) in the glove box, injecting 3 g of electrolyte into it, and letting it stand for 2 hours. Heat-sealing the liquid injection port in the glove box to complete the process.

(8) Lithium cobalt oxide soft-pack battery formation: Clamping the sealed soft-pack battery with a self-made plastic fixture, setting the formation program on the Xinwei test cabinet: charging at 0.02 C to 3.5 V, leaving it for 5 minutes, and charging at 0.05 C to 3.7 V, putting it aside for 5 minutes, charging at 0.33 C to 3.9 V, stopping; putting the charged battery in an oven at 45° C. and letting it stand for 24 hours to complete the formation of a lithium cobalt oxide soft-pack battery.

(9) Second sealing of lithium cobalt oxide soft-pack battery: Setting the head temperature of the second sealing machine to 180° C., the sharp knife puncture time to 2 s, and the vacuum retention time to 5 s. The formed battery is subjected to the second sealing on the second sealing machine, and then the air bag on the side of the battery is cut off.

(10) Lithium cobalt oxide soft-pack battery capacity separation: setting the capacity of the Xinwei test cabinet: charging at 0.33 C to 4.35 V, constant voltage charging to 0.05 C, putting it aside for 5 minutes, discharging at 0.33 C to 3.0 V, putting it aside for 5 minutes, charging at 0.33 C to 4.1 V, constant voltage charging to C, stopping; clamping the lithium cobalt oxide soft-pack battery on the test cabinet and testing according to this procedure to complete the capacity separation of a lithium cobalt oxide soft-pack battery.

Battery cycle performance test: setting the cycle program on the Xinwei test cabinet: charging at 1 C to 4.35 V, charging at constant voltage to 0.05 C, leaving it for min, discharging at 1 C to 3.0 V, leaving it for 5 min, and circulating for 500 laps until the end; the lithium cobalt oxide soft-pack battery is clamped on the test cabinet and tested according to this procedure to complete the cycle test of a lithium cobalt oxide soft-pack battery.

High-temperature storage capacity recovery performance test: setting the cycle program on the Xinwei test cabinet: discharging at 1 C to 3.0 V, leaving it for 5 min, charging to 4.35 V at 1 C, charging to 0.05 C at constant voltage, leaving it for 5 min, cycling for 2 times, ending. After the lithium cobalt oxide soft-pack battery is fully charged according to this procedure, it is stored in an oven at 45° C. for 7, 15, and days, and the capacity of different storage periods is tested according to the above sequencing to complete the high-temperature storage capacity recovery performance test of the lithium cobalt oxide soft-pack battery.

EXAMPLE 2

The specific steps of the method for preparing the lithium cobalt oxide soft-pack battery of this example are as follows:

(1) Drying the lithium cobalt oxide cathode material to be tested (applicable voltage 4.4 V) at 100° C. for 12 h;

(2)-(6) are the same as in Example 1;

(7) Lithium cobalt oxide soft-pack battery injection, first sealing: injecting the soft-pack battery dried in step (6) into the glove box, injecting 3.2 g of electrolyte into it, and letting it stand for 2 hours. Heat-sealing the liquid injection port in the glove box to complete the process.

(8) Lithium cobalt oxide soft-pack battery formation: clamping the sealed soft-pack battery with a self-made plastic fixture, setting the formation program on the Xinwei test cabinet: charging at 0.02 C to 3.5 V, leaving it for 5 minutes, and charging at 0.05 C to 3.7 V, putting it aside for 5 minutes, charging at 0.33 C to 3.9 V, stopping; putting the charged battery in an oven at 45° C. and letting it stand for 24 hours to complete the formation of a lithium cobalt oxide soft-pack battery.

(9) Second sealing of lithium cobalt oxide soft-pack battery: Setting the head temperature of the second sealing machine to 180° C., the sharp knife puncture time to 2 s, and the vacuum retention time to 6 s. The formed battery is subjected to the second sealing on the second sealing machine, and then the air bag on the side of the battery is cut off.

(10) Lithium cobalt oxide soft-pack battery capacity separation: setting the capacity of the Xinwei test cabinet: charging at 0.33 C to 4.4 V, constant voltage charging to 0.05 C, putting it aside for 5 minutes, discharging at 0.33 C to 3.0 V, putting it aside for 5 minutes, charging at 0.33 C to 4.2 V, constant voltage charging to 0.05 C, stopping; clamping the lithium cobalt oxide soft-pack battery on the test cabinet and testing according to this procedure to complete the capacity separation of a lithium cobalt oxide soft-pack battery.

Battery cycle performance test: setting the cycle program on the Xinwei test cabinet: charging at 1 C to 4.4 V, charging at constant voltage to 0.05 C, leaving it for 5 min, discharging at 1 C to 3.0 V, leaving it for 5 min, and circulating for 500 laps until the end. The lithium cobalt oxide soft-pack battery is clamped on the test cabinet and tested according to this procedure to complete the cycle test of a lithium cobalt oxide soft-pack battery.

High-temperature storage capacity recovery performance test: setting the cycle program on the Xinwei test cabinet: discharging at 1 C to 3.0 V, leaving it for 5 min, charging to 4.4 V at 1 C, charging to 0.05 C at constant voltage, leaving it for 5 min, cycling for 2 cycles, ending. After the lithium cobalt oxide soft-pack battery is fully charged according to this procedure, it is stored in an oven at 45° C. for 7, 15, and 30 days, and the capacity of different storage periods is tested according to the above sequencing to complete the high-temperature storage capacity recovery performance test of the lithium cobalt oxide soft-pack battery.

Comparative Example 1

A preparation method and battery of a lithium cobalt oxide soft-pack battery are as follows:

The difference from Example 1 is that Comparative Example 1 does not have steps (1.8) and (2.8); there is no drying treatment in steps (3) and (6); and step (8) does not undergo high-temperature standing treatment after the completion of the formation procedure. The rest of the steps are the same as in Example 1.

Comparative Example 2

A preparation method and battery of a lithium cobalt oxide soft-pack battery are as follows:

The difference from Example 2 is that Comparative Example 2 does not have steps (1.8) and (2.8); there is no drying treatment in steps (3) and (6); and step (8) does not undergo high-temperature standing treatment after the completion of the formation procedure. The rest of the steps are the same as in Example 2.

Comparative Example 3

A preparation method and battery of a lithium cobalt oxide soft-pack battery are as follows:

Different from Example 1, Comparative Example 3 does not have the drying process of steps (3) and (6). The rest of the steps are the same as in Example 1.

Table 1 Comparison table of capacity and first cycle efficiency of different lithium cobalt oxide soft-pack batteries in the examples and the comparative examples

| sample | capacity (mAh) | first cycle efficiency (%) |
|---|---|---|
| Example 1 | 721.5 | 89.6 |
| Example 2 | 780.2 | 90.1 |
| Comparative Example 1 | 697.3 | 86.1 |
| Comparative Example 2 | 742.6 | 87.8 |
| Comparative Example 3 | 702.3 | 86.3 |

Table 2 Comparison table of capacity recovery of lithium cobalt oxide soft-pack batteries in the examples and the comparative examples

| Storage days | Example 1 | Example 2 | Comparative Example 1 | Comparative Example 2 | Comparative Example 3 |
|---|---|---|---|---|---|
| 7 d | 98.2% | 98.5% | 92.7% | 93.3% | 93.3% |
| 15 d | 97.1% | 96.8% | 85.5% | 84.2% | 86.7% |
| 30 d | 95.8% | 94.7% | 79.8% | 78.2% | 81.8% |

It can be seen from Table 1 that when the lithium cobalt oxide material of 4.35 V or 4.4 V is made into a soft-pack battery, there is a difference in capacity, and the preparation method of the present invention can feed back this difference. Comparing the separation capacity of Examples 1, 2 and Comparative Examples 1, 2, and 3, the soft-pack battery in the comparative example has a lower capacity than that in the examples, indicating that in the preparation method of the present invention, each drying process played a significant role. It can be seen from Table 2 that the capacity recovery conditions of Examples 1, 2 and Comparative Examples 1, 2, and 3 stored at 45° C. for 7, 15, and 30 days are different, and the capacity recovery conditions of the Examples are better than those of the Comparative Examples. It can be seen from FIG. 3 that the cycle performance of the lithium cobalt oxide soft-packed battery of the example of the present invention is better than that of the comparative example.

In summary, the simple laboratory preparation method of the lithium cobalt oxide soft-pack battery provided by the present invention can be completed under normal temperature and humidity, and does not need to be carried out in a drying room, which greatly saves test costs. The prepared soft-pack battery has excellent cycle performance and safety, and the method have good application value in the laboratory.

FIG. 1 is a preparation flow chart of the simple laboratory lithium cobalt oxide soft-pack battery of the present invention. From FIG. 1, it can be seen that the preparation method of the lithium cobalt oxide soft-pack battery of the present invention is relatively intuitive, concise and clear.

Figure 2:
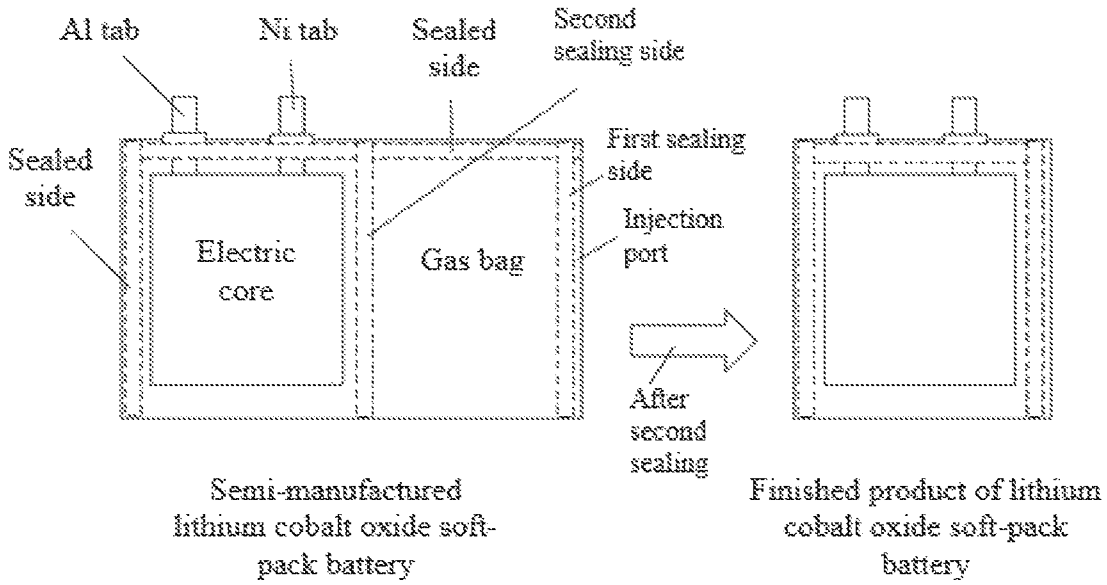
FIG. 2 is a schematic diagram of the preparation process of the lithium cobalt oxide soft-pack battery of the present invention.

FIG. 2 is a schematic diagram of the preparation process of the lithium cobalt oxide soft-pack battery of the present invention; from FIG. 2, the structure of the lithium cobalt oxide soft-pack battery of the present invention can be seen, which facilitates a better understanding of the preparation of the soft-pack battery according to the method of the present invention.

Figure 3:
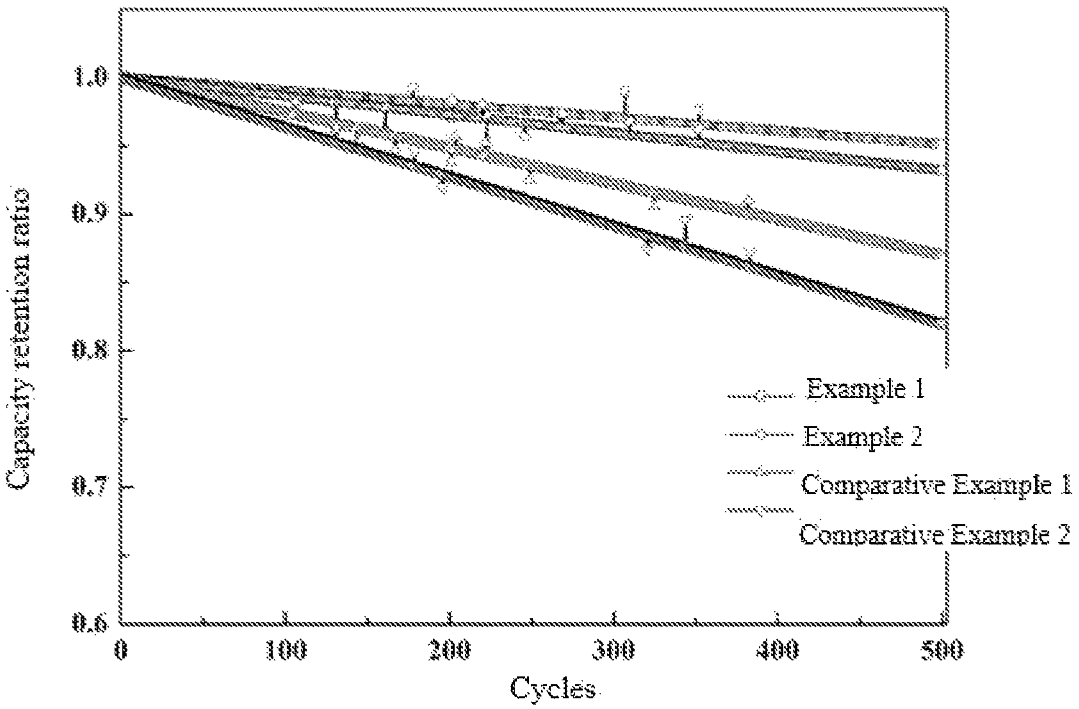
FIG. 3 is a graph of the cycle performance of different lithium cobalt oxide soft-pack batteries in Example 1-2 and Comparative Example 1-2 of the present invention.

FIG. 3 is a graph of the cycle performance of different lithium cobalt oxide soft-pack batteries in Example 1-2 and Comparative Example 1-2 of the present invention; from FIG. 3, the performance of the lithium cobalt oxide soft-pack battery prepared by the method of the present invention can be seen, to facilitate a better understanding of the advantages of the method of the present invention.

The examples of the present invention have been described in detail above with reference to the accompanying drawings. However, the present invention is not limited to the above-mentioned examples. Within the scope of knowledge possessed by those of ordinary skill in the art, various modifications can be made without departing from the purpose of the present invention. Variety. In addition, in the case of no conflict, the examples of the present invention and the features in the examples can be combined with each other.

The invention claimed is:

1. A preparation method for a lithium cobalt oxide soft-pack battery, comprising the following steps:

(1) mixing a lithium cobalt oxide cathode material, polyvinylidene fluoride, carbon black and an organic solvent and stirring, then vacuumizing, sieving, coating a resulting slurry on an aluminum foil, rolling, slitting, and drying to obtain a positive electrode strip;

(2) mixing a graphite material, a carboxymethyl cellulose salt, carbon black, a conductive agent, styrene-butadiene rubber and water, and then vacuumizing, sieving, coating a resulting slurry on a copper foil, rolling, slitting, and drying to get a negative electrode strip;

(3) cutting an aluminum-plastic film, and then performing punching and drying to obtain an aluminum-plastic film with pits; wherein the drying is carried out at a temperature of 90 to 120° C. for 8-15 h;

(4) performing screening and tab welding to the positive electrode and negative electrode strip respectively, winding the positive electrode strip, the negative electrode strip and a separator to make an electric core, and then performing hot pressing to obtain a hot-pressed electric core;

(5) placing the hot-pressed electric core in the pit of the aluminum-plastic film, folding the aluminum-plastic film in half, heat-sealing the sides, and then vacuum drying to obtain a vacuum-dried pack;

(6) filling the vacuum-dried pack with an electrolyte in a glove box, letting stand before performing a first sealing, then performing formation, letting stand to release gas, and performing a second sealing to obtain a battery; wherein after the first sealing, a process of shaping the battery is further included; and the formation is carried out with following procedure in a test cabinet: charging to 3.4-3.5 V at 0.02 or 0.05 C, leaving for 3-5 min, then charging to 3.6-3.7 V at 0.05 or 0.1 C, and leaving for 3-5 min, finally charging to 3.9-4.0 V at 0.1 or 0.33 C and stopping to complete the formation procedure;

(7) capacity grading the battery to obtain the lithium cobalt oxide soft-pack battery; wherein the capacity grading is carried out with following procedure: charging to 4.2-4.5 V at 0.1 or 0.33 C, leaving it for 3-5 min, then discharging to 3.0-3.2 V at 0.1 or 0.33 C, finally charging to 4.0-4.2 V at 0.1 or 0.33 C and stopping to complete the capacity grading of the lithium cobalt oxide soft-pack battery.

2. The preparation method according to claim 1, wherein in step (1), the mass ratio of the lithium cobalt oxide cathode material, polyvinylidene fluoride and carbon black is (90-96): (2-5): (1-5).

3. The preparation method according to claim 1, wherein in step (1), the organic solvent is N-methylpyrrolidone.

4. The preparation method according to claim 1, wherein from step (1) to step (2), the drying is carried out at a temperature of 90 to 120° C. for 8-15 h in a vacuum drying oven at a vacuum degree --0.08-0.06 Mpa.

5. The preparation method according to claim 1, wherein in step (2), the mass ratio of the graphite negative electrode material, the carbon black, the conductive agent, the carboxymethyl cellulose salt and the styrene butadiene rubber is (92-95): (0.3-1): (0.8-2): (1-3): (1.5-4).

6. The preparation method according to claim 1, wherein in step (5), the heat sealing is carried out in a heat sealer at a sealing temperature of 180° C. to 200° C.; the vacuum drying is carried out at a temperature of 90 to 110° C. for 12-24 h, and the vacuum drying is carried out at a vacuum degree of 0.08-0.09 MPa; wherein in step (6), the electrolyte is a lithium hexafluorophosphate electrolyte, and the lithium hexafluorophosphate electrolyte comprises ethylene carbonate, dimethyl carbonate, and methyl ethyl carbonate in a volume ratio of 1: (1-2): (1-2).

7. The preparation method according to claim 1, wherein in step (6), the letting stand is carried out in a high-temperature box at 40-50° C.

* * * * *